(12) United States Patent
Kimura et al.

(10) Patent No.: US 10,416,744 B2
(45) Date of Patent: Sep. 17, 2019

(54) DATA PROCESSING APPARATUS, STRUCTURE AND POWER GENERATION APPARATUS INCLUDING THE SAME

(71) Applicant: Rohm Co., Ltd., Kyoto (JP)

(72) Inventors: Hiromitsu Kimura, Kyoto (JP); Takaaki Fuchikami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 77 days.

(21) Appl. No.: 15/140,650

(22) Filed: Apr. 28, 2016

(65) Prior Publication Data

US 2016/0334849 A1     Nov. 17, 2016

(30) Foreign Application Priority Data

May 11, 2015   (JP) .................................. 2015-096468

(51) Int. Cl.
*G06F 1/28*     (2006.01)
*G06F 9/48*     (2006.01)
*H02J 1/10*     (2006.01)

(52) U.S. Cl.
CPC .............. *G06F 1/28* (2013.01); *G06F 9/4893* (2013.01); *H02J 1/108* (2013.01)

(58) Field of Classification Search
CPC ........... G06F 1/28; G06F 9/4893; H02J 1/108
See application file for complete search history.

(56) References Cited

U.S. PATENT DOCUMENTS

| | | | | |
|---|---|---|---|---|
| 3,590,287 A | * | 6/1971 | Berlincourt | .......... H03H 9/0207 310/321 |
| 2002/0177942 A1 | * | 11/2002 | Knaian | .................... G08G 1/02 701/117 |
| 2009/0088077 A1 | * | 4/2009 | Brown | .................... H04B 5/02 455/41.2 |
| 2010/0146333 A1 | * | 6/2010 | Yong | ....................... G06F 1/305 714/14 |
| 2015/0135042 A1 | * | 5/2015 | Im | ....................... G06F 11/1004 714/807 |

FOREIGN PATENT DOCUMENTS

JP          2014-75696         4/2014

* cited by examiner

*Primary Examiner* — Austin Hicks
(74) *Attorney, Agent, or Firm* — Fish & Richardson P.C.

(57) ABSTRACT

A data processing apparatus includes: a plurality of power supplies; a nonvolatile logic configured to be driven with power output from the plurality of power supplies; and a plurality of detection parts configured to detect output states of the plurality of power supplies, wherein the nonvolatile logic performs data processing based on a result of the detection of the plurality of detection parts.

10 Claims, 12 Drawing Sheets

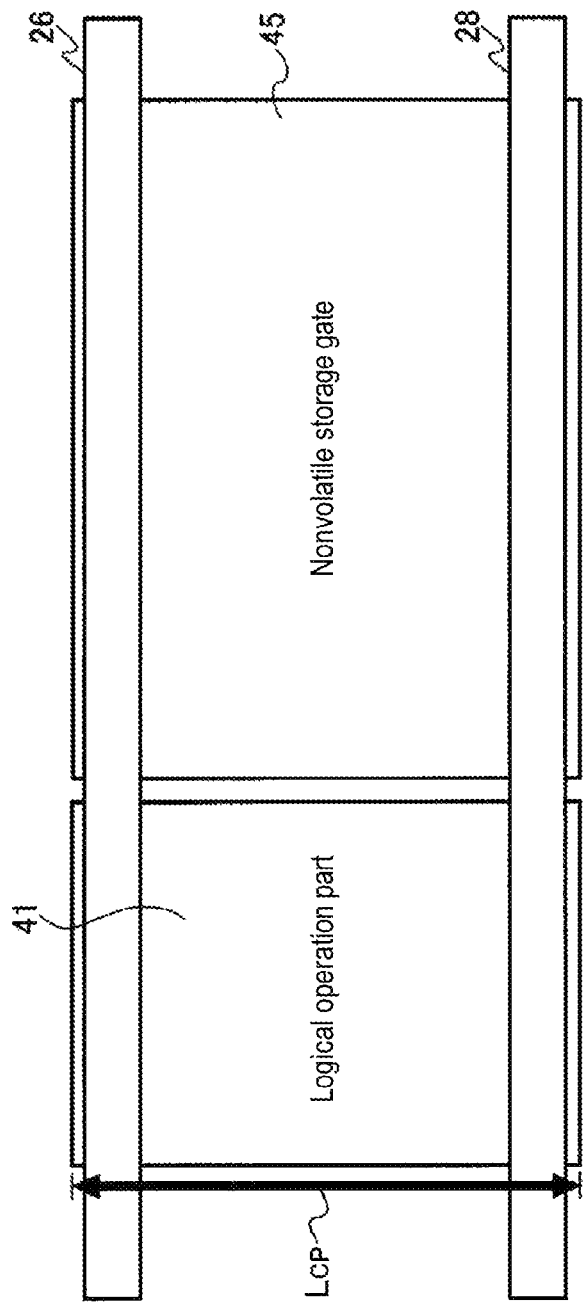

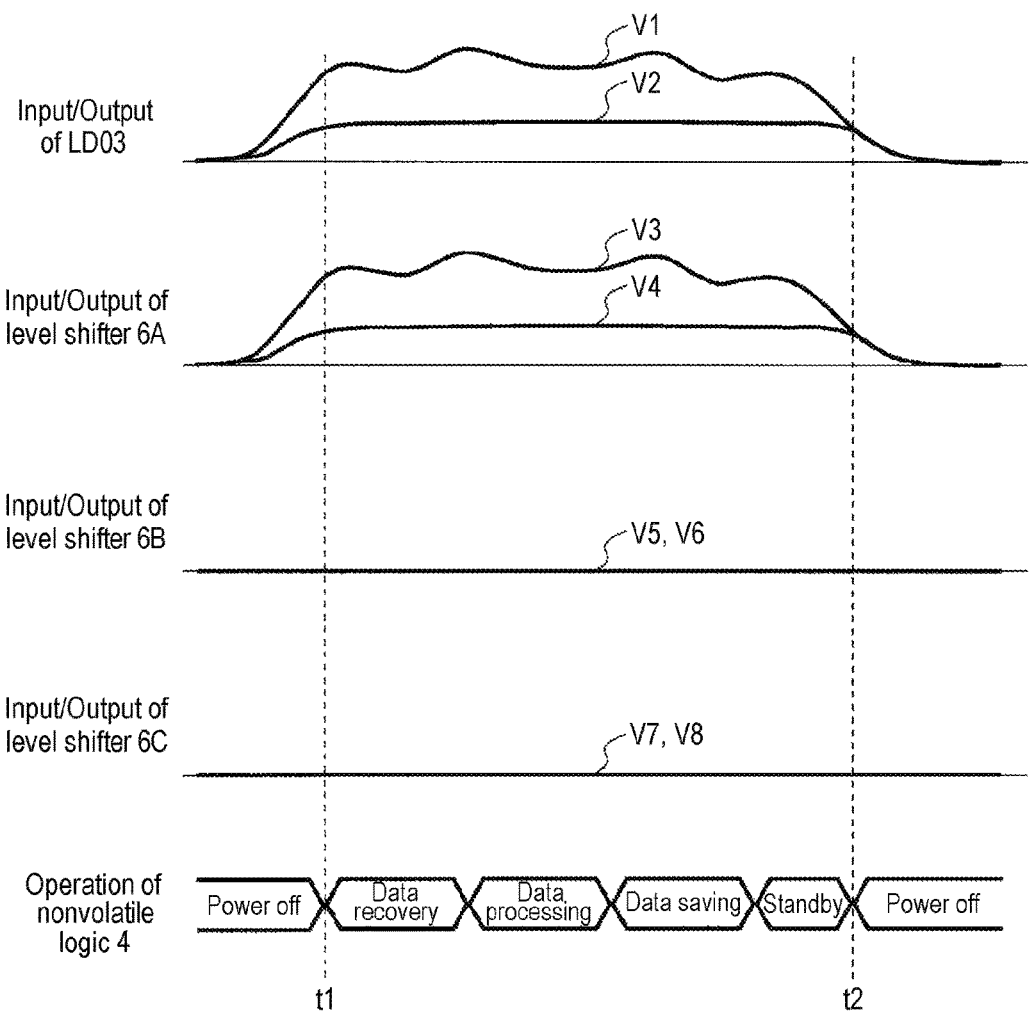

DATA PROCESSING APPARATUS, STRUCTURE AND POWER GENERATION APPARATUS INCLUDING THE SAME

CROSS-REFERENCE TO RELATED APPLICATION

This application is based upon and claims the benefit of priority from Japanese Patent Application No. 2015-096468, filed on May 11, 2015, the entire contents of which are incorporated herein by reference.

TECHNICAL FIELD

The present disclosure relates to a data processing apparatus with a nonvolatile logic, a structure and a power generation apparatus including the same.

BACKGROUND

In recent years, nonvolatile logics have been under development. A nonvolatile logic is a logical operation circuit which is capable of holding data even after the power supply is cut off and resuming data processing from a state immediately before the power supply is cut off when the supply of power is resumed.

The nonvolatile logic is being used for a variety of apparatuses. For example, in related arts, the nonvolatile logic is being used for a counter counting the frequency of power-on.

However, in the related arts, the nonvolatile logic is only to seek the number of power-on (scalar quantity) by means of a logical operation but cannot generate data of vector quantity related to power supplies. If data of vector quantity related to power supplies can be generated, it can be expected that the nonvolatile logic has a higher possibility of a wide variety of analysis on the power supplies and hence a wider range of applications.

SUMMARY

The present disclosure provides some embodiments of a data processing apparatus which is capable of generating data of vector quantity related to power supplies, a structure and a power generation apparatus including the same.

According to one embodiment of the present disclosure, there is provided a data processing apparatus including: a plurality of power supplies; a nonvolatile logic configured to be driven with power output from the plurality of power supplies; and a plurality of detection parts configured to detect output states of the plurality of power supplies, wherein the nonvolatile logic performs data processing based on a result of the detection of the plurality of detection parts.

Further, the nonvolatile logic may include: a logical operation part; a volatile storage part; a nonvolatile storage part; and a data control part, wherein, after the nonvolatile logic is switched from a state where the nonvolatile logic is not driven to a state where the nonvolatile logic is driven with power supplied to the nonvolatile logic, the data control part writes data read from the nonvolatile storage part in the volatile storage part, wherein the logical operation part performs the data processing and updates the data written in the volatile storage part, and wherein the data control part reads the updated data written in the volatile storage part from the volatile storage part and writes the read data in the nonvolatile storage part.

Further, at least one of the plurality of power supplies may be a power generating element which converts external energy into electricity.

Further, at least two of the plurality of power supplies may be piezoelectric elements which are arranged such that piezoelectric axes of the piezoelectric elements lie in different directions.

Further, the data processing apparatus may further include: a power converting part configured to convert the power output from the plurality of power supplies into stabilized DC power and supply the stabilized DC power to the nonvolatile logic.

Further, according to another embodiment of the present disclosure, there is provided a structure including: the above-described data processing apparatus, wherein all of the plurality of power supplies are the power generating elements; and a transmission part configured to be operated with power supplied from external equipment and transmit a result of the data processing of the nonvolatile logic to the external equipment.

Further, the transmission part may be an RF communication part conducting near field communication with the external equipment and may be operated with the power supplied from the external equipment by the near field communication.

Further, the structure may further include: a rechargeable battery supplying power to the transmission part, wherein the rechargeable battery is charged with a portion of the power output from the plurality of power supplies.

Further, if the result of the data processing of the nonvolatile logic is a predetermined result, the nonvolatile logic may generate data indicating a warning and outputs the data to the transmission part, and, in response to receiving the data indicating the warning from the nonvolatile logic, the transmission part may transmit a warning signal to the external equipment.

According to another embodiment of the present disclosure, there is provided a power generation apparatus including: the above-described data processing apparatus; and a transmission part configured to be operated with power supplied from external equipment and transmit a result of the data processing of the nonvolatile logic to the external equipment, wherein each of the plurality of power supplies is a solar cell.

BRIEF DESCRIPTION OF THE DRAWINGS

FIG. 2C is a view showing a schematic layout pattern configuration example of the nonvolatile logic.

FIG. 3 is a time chart for explaining an example of an operation of the data processing apparatus according to the first embodiment.

DETAILED DESCRIPTION

<First Embodiment>

Figure 1:
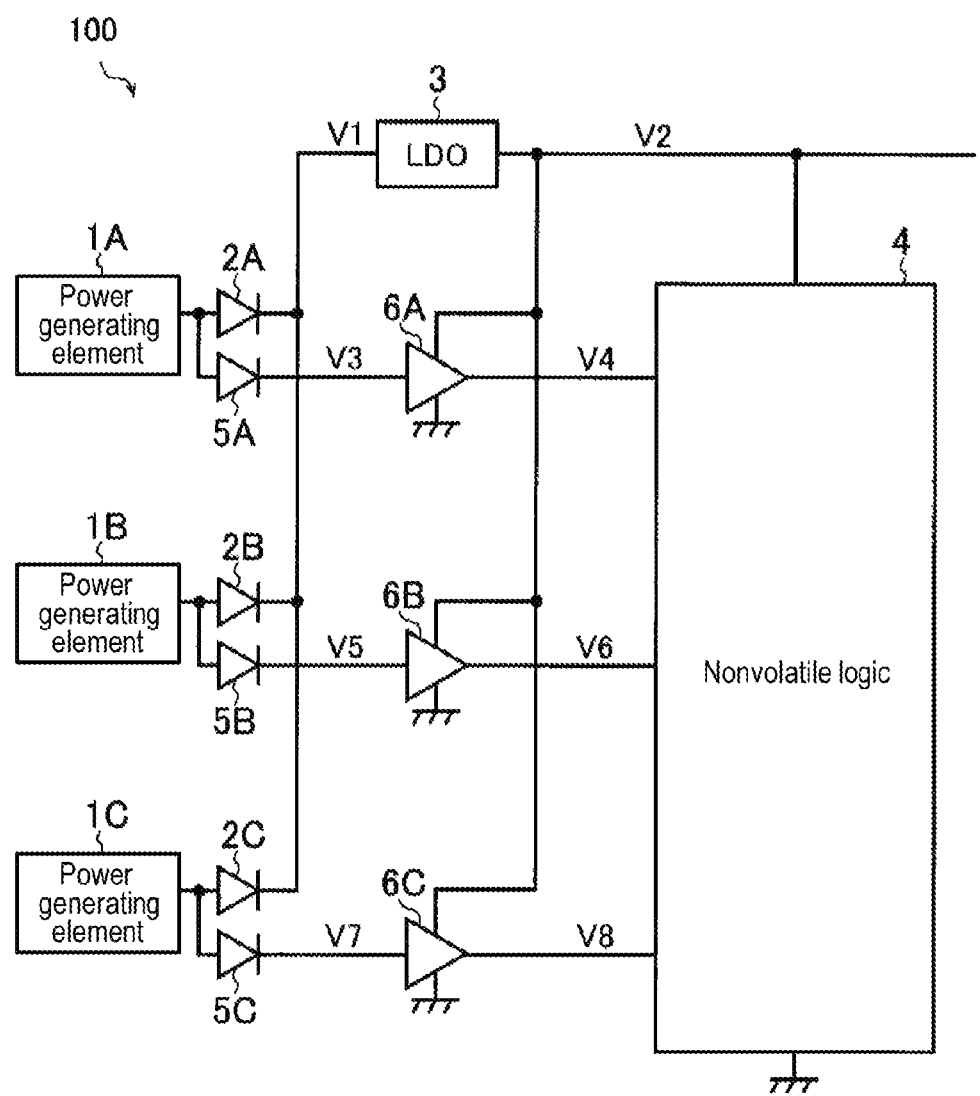
FIG. 1 is a view showing a data processing apparatus according to a first embodiment of the present disclosure.

FIG. 1 is a view showing a data processing apparatus according to a first embodiment of the present disclosure. A data processing apparatus 100 shown in FIG. 1 includes power generating elements 1A to 1C, backflow preventing diodes 2A to 2C and 5A to 5C, a low-saturated regulator 3 called LDO (Low Drop Out), a nonvolatile logic 4, and level shifters 6A to 6C. Examples of the power generating elements may include solar cells for converting the sunlight into electricity, and bimorphs for converting a force applied to a structure having two piezoelectric plates bonded together into electricity, etc.

In embodiments, which will be described later, as well as the first embodiment, for the purpose of simplification of description, it is assumed that a forward voltage of each backflow preventing diode and a loss in a connection path are zero.

Upon receiving external energy, each of the power generating elements 1A to 1C converts the external energy into electricity. Output terminals of the power generating elements 1A to 1C are connected to anodes of the backflow preventing diodes 2A to 2C, respectively. Cathodes of the backflow preventing diodes 2A to 2C are connected in common to an input terminal of the low-saturated regulator 3.

Therefore, a voltage V1, which is a voltage obtained by synthesizing output voltages of the power generating elements 1A to 1C (i.e., the greatest one of the output voltages of the power generating elements 1A to 1C), is supplied to the input terminal of the low-saturated regulator 3. In addition, since the backflow preventing diodes 2A to 2C are provided, no current flows from the input terminal of the low-saturated regulator 3 toward a power generating element whose output voltage is smaller than the voltage V1.

The low-saturated regulator 3 drops the voltage V1 supplied to its input terminal, converts the dropped voltage V1 into a stabilized DC voltage (a DC voltage having the same value or substantially the same value as a target voltage), and outputs the stabilized DC voltage from its output terminal. However, if the voltage V1 is small, since regulating by the voltage drop cannot be performed, an output voltage V2 of the low-saturated regulator 3 becomes zero. In addition, in transition from the stabilized DC voltage to zero or in transition from zero to the stabilized DC voltage, the output voltage V2 of the low-saturated regulator 3 has a transient value. The output terminal of the low-saturated regulator 3 is connected to a power terminal of the nonvolatile logic 4 and each of power terminals of the level shifters 6A to 6C. In addition, a ground terminal of the nonvolatile logic 4 and each of ground terminals of the level shifters 6A to 6C are held at a ground potential.

Thus, when the low-saturated regulator 3 outputs the stabilized DC voltage, each of the nonvolatile logic 4 and the level shifters 6A to 6C is driven by using a difference between the voltage V2 and the ground potential as a power voltage.

Each of the level shifters 6A to 6C outputs a voltage, which has the same level (hereinafter also referred to as a high level) as the stabilized DC voltage supplied to its power terminal, from its output terminal if a voltage supplied to its input terminal is equal to or greater than a threshold, and outputs a voltage, which has the same level (hereinafter also referred to as a low level) as the ground potential, from its output terminal if the voltage supplied to its input terminal is smaller than the threshold. Further, the output terminals of the power generating elements 1A to 1C are connected to the input terminals of the level shifters 6A to 6C via the backflow preventing diodes 5A to 5C, respectively. The output terminals of the level shifters 6A to 6C are connected to data input terminals of the nonvolatile logic 4, respectively.

Therefore, if an output voltage V3 of the power generating element 1A is equal to or greater than a threshold, the level shifter 6A outputs a voltage V4 of a high level to the nonvolatile logic 4. If the output voltage V3 of the power generating element 1A is smaller than the threshold, the level shifter 6A outputs the voltage V4 of a low level to the nonvolatile logic 4. In other words, the level shifter 6A detects whether or not the output voltage V3 of the power generating element 1A reaches the threshold, and outputs a result of the detection to the nonvolatile logic 4. In transition from the high level to the low level or in transition from the low level to the high level, the output voltage V4 of the level shifter 6A has a transient value.

Likewise, the level shifter 6B detects whether or not an output voltage V5 of the power generating element 1B reaches a threshold, and outputs a result of the detection to the nonvolatile logic 4. The level shifter 6C detects whether or not a voltage V7 of the power generating element 1C reaches a threshold, and outputs a result of the detection to the nonvolatile logic 4.

Further, since the backflow preventing diodes 5A to 5C are provided, even when the power terminals and the input terminals in the level shifters are short-circuited, no current flows from the input terminals of the level shifters toward a power generating element whose output voltage is smaller than the stabilized DC voltage.

Figure 2A:
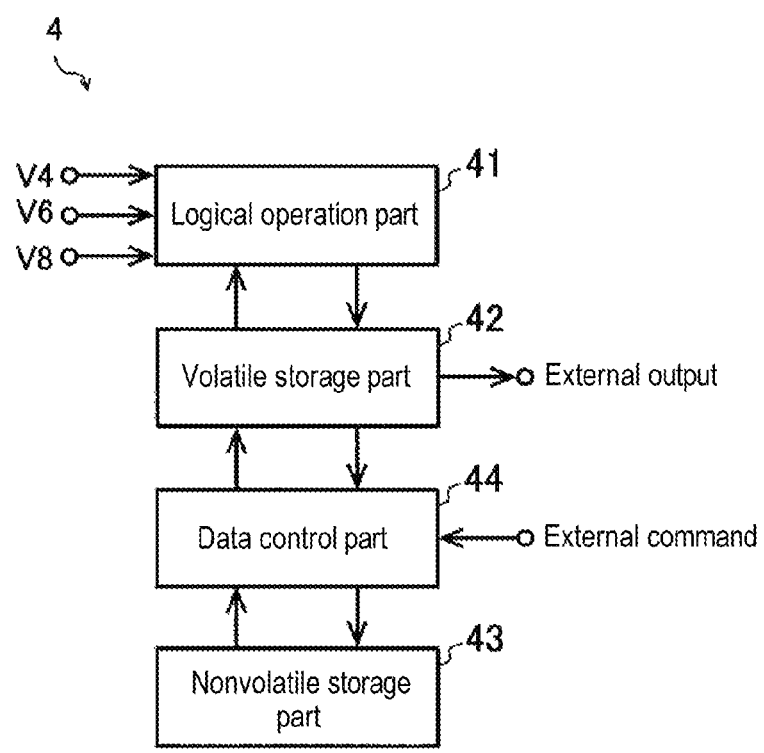
FIG. 2A is a view showing one configuration example of a nonvolatile logic.

FIG. 2A is a view showing one configuration example of the nonvolatile logic 4. The nonvolatile logic 4 includes a logical operation part 41, a volatile storage part 42, a nonvolatile storage part 43 and a data control part 44. The nonvolatile storage part 43 includes, for example, one of a ferroelectric element, a floating gate MOS transistor, a magneto-resistive effect element and a phase change element, by which data can be stored in a nonvolatile manner.

The logical operation part 41 performs a logical operation using the output voltages of the level shifters 6A to 6C, i.e., performs data processing corresponding to the output voltages of the level shifters 6A to 6C.

Data written in the volatile storage part 42 is updated by a logical operation result (data processing result) of the logical operation part 41.

The data control part 44 can write data read from the volatile storage part 42 in the nonvolatile storage part 43, while writing data read from the nonvolatile storage part 43 in the volatile storage part 42. Further, the data control part 44 can control the volatile storage part 42 according to external commands and output the data written in the volatile storage part 42 from the volatile storage part 42 to the outside.

Figure 2B:
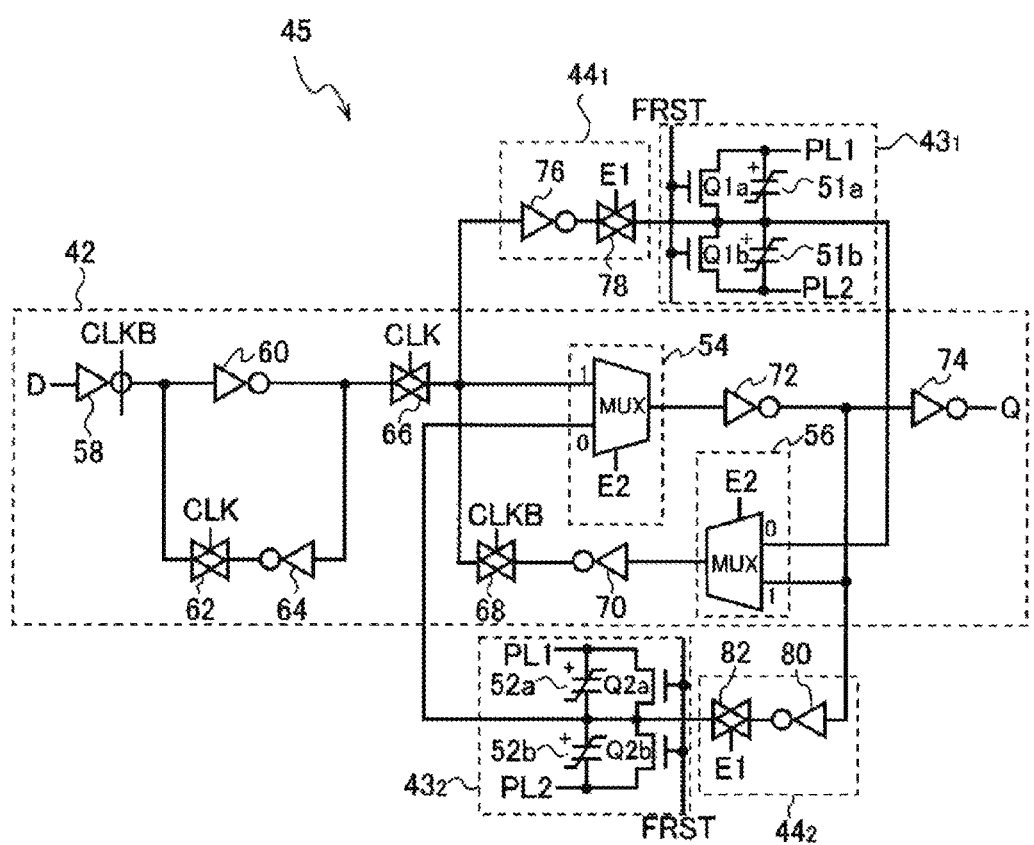
FIG. 2B is a view showing one configuration example of a nonvolatile storage gate.

FIG. 2B is a view showing one configuration example of a nonvolatile storage gate 45 consisting of the volatile storage part 42, the nonvolatile storage part 43 and the data control part 44. In the configuration example shown in FIG. 2B, the nonvolatile storage gate 45 includes first and second nonvolatile storage parts $43_1$ and $43_2$, a first data interface control part $44_1$ which is disposed adjacent to the first nonvolatile storage part $43_1$ and receives an external control signal for writing data in the first nonvolatile storage part $43_1$ and reading data from the first nonvolatile storage part $43_1$, a second data interface control part $44_2$ which is disposed adjacent to the second nonvolatile storage part $43_2$ and receives an external control signal for writing data in the second nonvolatile storage part $43_2$ and reading data from the second nonvolatile storage part $43_2$, and a volatile storage part 42 which is disposed adjacent to the first and second data interface control parts $44_1$ and $44_2$, and receives a data input signal D from a data input terminal and a clock signal CLK from a clock input terminal, and outputs a data output signal Q from a data output terminal.

The "external commands" shown in FIG. 2A correspond to "FRST," "E1," "E2," "PL1" and "PL2" shown in FIG. 2B.

The first nonvolatile storage part $43_1$ includes MOS transistors Q1a and Q1b and ferroelectric capacitors 51a and 51b, and the second nonvolatile storage part $43_2$ includes MOS transistors Q2a and Q2b and ferroelectric capacitors 52a and 52b.

The volatile storage part 42 includes inverters 58, 60, 64, 70, 72 and 74 and path switches 62, 66 and 68.

The first data interface control part $44_1$ includes an inverter 76, a path switch 78 and a multiplexer 54, and the second data interface control part $44_2$ includes an inverter 80, a path switch 82 and a multiplexer 56.

An input terminal of the inverter 58 is connected to an application terminal of the data input signal D. An output terminal of the inverter 58 is connected to an input terminal of the inverter 60. An output terminal of the inverter 60 is connected to a first input terminal (1) of the multiplexer 54 via the path switch 66. Further, the output terminal of the inverter 60 is connected to an input terminal of the inverter 64, and an output terminal of the inverter 64 is connected to the input terminal of the inverter 60 via the path switch 62.

An output terminal of the multiplexer 54 is connected to an input terminal of the inverter 72. An output terminal of the inverter 72 is connected to an input terminal of the inverter 74. An output terminal of the inverter 74 is connected to a lead-out terminal of the data output signal Q. In addition, the output terminal of the inverter 72 is connected to a first input terminal (1) of the multiplexer 56. An output terminal of the multiplexer 56 is connected to an input terminal of the inverter 70. An output terminal of the inverter 70 is connected to the first input terminal (1) of the multiplexer 54 via the path switch 68.

In this way, the nonvolatile storage gate 45 includes the volatile storage part 42 including a loop structure LOOP (a portion surrounded by reference numerals 54, 72, 56 and 70 in FIG. 2B) which holds the input data input signal D by using two logic gates (the inverters 72 and 70 in FIG. 2B) connected in a loop shape, as shown in FIG. 2B. The volatile storage part 42 further includes a loop formed by the inverters 60 and 64.

An input terminal of the inverter 76 is connected to the first input terminal (1) of the multiplexer 54. In more detail, the input terminal of the inverter 76 is connected with an output terminal of the inverter 60 via the path switch 66 or an output terminal of the inverter 70 via the path switch 68. An output terminal of the inverter 76 is connected to a second input terminal (0) of the multiplexer 56 via the path switch 78.

An input terminal of the inverter 80 is connected to the first input terminal (1) of the multiplexer 56. In more detail, the input terminal of the inverter 80 is connected with output terminal of the inverter 72. An output terminal of the inverter 80 is connected to a second input terminal (0) of the multiplexer 54 via the path switch 82.

A positive electrode terminal of the ferroelectric capacitor 51a is connected to a first plate line through which a ferroelectric element driving signal PL1 is supplied to the positive electrode terminal. A negative electrode terminal of the ferroelectric capacitor 51a is connected to the second input terminal (0) of the multiplexer 56. The MOS transistor Q1a is connected between both terminals of the ferroelectric capacitor 51a. A gate of the MOS transistor Q1a is connected to an application terminal of a ferroelectric element both ends short-circuit signal FRST.

A positive electrode terminal of the ferroelectric capacitor 51b is connected to the second input terminal (0) of the multiplexer 56. A negative electrode terminal of the ferroelectric capacitor 51b is connected to a second plate line through which a ferroelectric element driving signal PL2 is supplied to the negative electrode terminal. The MOS transistor Q1b is connected between both terminals of the ferroelectric capacitor 51b. A gate of the MOS transistor Q1b is connected to the application terminal of the ferroelectric element both ends short-circuit signal FRST.

A positive electrode terminal of the ferroelectric capacitor 52a is connected to the first plate line through which the ferroelectric element driving signal PL1 is supplied to the positive electrode terminal. A negative electrode terminal of the ferroelectric capacitor 52a is connected to the second input terminal (0) of the multiplexer 54. The MOS transistor Q2a is connected between both terminals of the ferroelectric capacitor 52a. A gate of the MOS transistor Q2a is connected to the application terminal of the ferroelectric element both ends short-circuit signal FRST.

A positive electrode terminal of the ferroelectric capacitor 52b is connected to the second input terminal (0) of the multiplexer 56. A negative electrode terminal of the ferroelectric capacitor 52b is connected to the second plate line through which the ferroelectric element driving signal PL2 is supplied to the negative electrode terminal. The MOS transistor Q2b is connected between both terminals of the ferroelectric capacitor 52b. A gate of the MOS transistor Q2b is connected to the application terminal of the ferroelectric element both ends short-circuit signal FRST.

Among the above-described elements, the path switches 62 and 66 are turned on/off in response to the clock signal CLK and a tri-state inverter 58 and the path switch 68 are turned on/off in response to an inverted clock signal CLKB (a logical inverted signal of the clock signal CLK). The tri-state inverter 58 and the path switch 62 are turned on/off in an exclusive (complementary) manner. Further, the path switch 66 and the path switch 68 are turned on/off in an exclusive (complementary) manner. On the other hand, the path switches 78 and 82 are turned on/off in response to a ferroelectric element write signal E1. In addition, signal paths of the multiplexers 54 and 56 are switched in response to a normal operation signal E2.

In this embodiment, as shown in FIG. 2C, in a layout pattern of the nonvolatile logic 4, the logical operation part 41 and the nonvolatile storage gate 45 have the same cell pitch $L_{CP}$. Further, a power line (VVDD1) 26 and a ground line (VGND1) 28 used for the logical operation part 41 and the nonvolatile storage gate 45 have the same line width. In other words, as shown in FIG. 2C, the logical operation part 41 and the nonvolatile storage gate 45 are interposed between the power line 26 and the ground line 28 such that they have the same cell pitch $L_{CP}$. Moreover, since the power line 26 and the ground line 28 have the same line width, the logical operation part 41 and the nonvolatile storage gate 45 can have the same arrangement. Here, the logical operation part 41 includes, for example, an inverter INV, a NAND gate, a NOR gate, etc.

Figure 2D:
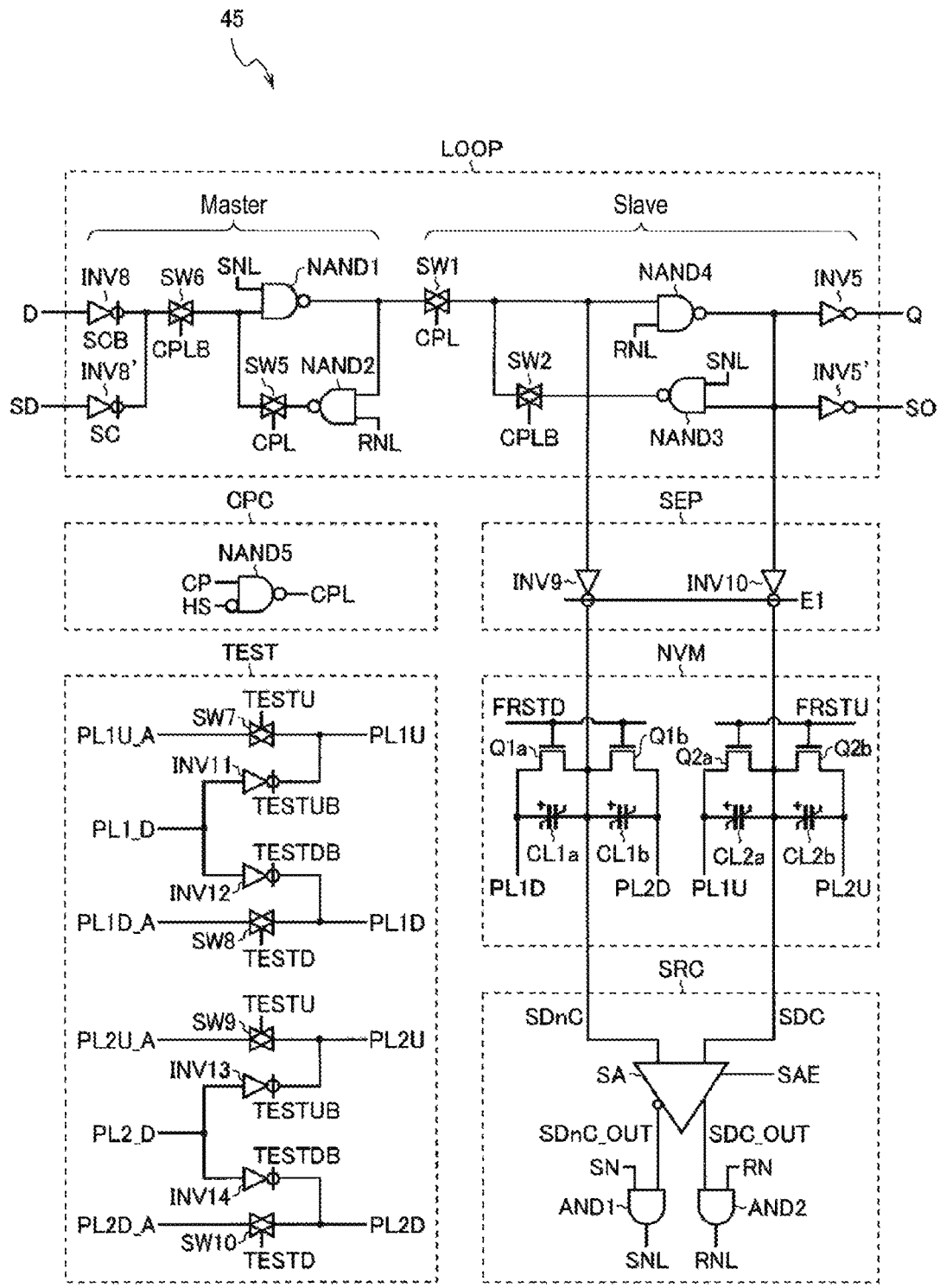
FIG. 2D is a view showing another configuration example of the nonvolatile storage gate.

FIG. 2D shows another configuration example of the nonvolatile storage gate 45. In the configuration example shown in FIG. 2D, the nonvolatile storage gate 45 includes a loop structure part LOOP corresponding to the volatile storage part 42, a nonvolatile storage part NVM corresponding to the nonvolatile storage part 43, a circuit separating part SEP corresponding to the data control part 44, a set/reset control part SRC, a clock pulse control part CPC and a test circuit part TEST, and acts as a D flip-flop (register) with a set/reset function.

The loop structure part LOOP includes NAND gates NAND1 to NAND4, path switches SW1, SW2, SW5 and SW6, inverters INV5 and INV5' and tri-state inverters INV8 and INV8'.

An input terminal of the inverter INV8 is connected to an input terminal of data D. An input terminal of the inverter INV8' is connected to an input terminal of scan data SD. Output terminals of the inverters INV8 and INV8' are both connected to a first input terminal of the NAND gate NAND1 via the path switch SW6. A second input terminal of the NAND gate NAND1 is connected to an input terminal of an internal set signal SNL. An output terminal of the NAND gate NAND1 is connected to a first input terminal of the NAND gate NAND2 and is also connected to a first input terminal of the NAND gate NAND4 via the path switch SW1. A second input terminal of the NAND gate NAND2 is connected to an input terminal of an internal reset signal RNL. An output terminal of the NAND gate NAND2 is connected to the first input terminal of the NAND gate NAND1 via the path switch SW5.

A second input terminal of the NAND gate NAND4 is connected to the input terminal of the internal reset signal RNL. An output terminal of the NAND gate NAND4 is connected to an output terminal of output data Q via the inverter INV5 and is also connected to an output terminal of scan output data SO via the inverter INV5'. Further, the output terminal of the NAND gate NAND4 is also connected to a first input terminal of the NAND gate NAND3. A second input terminal of the NAND gate NAND3 is connected to the input terminal of the internal set signal SNL. An output terminal of the NAND gate NAND3 is connected to the first input terminal of the NAND gate NAND4 via the path switch SW2.

A control terminal of the inverter INV8 is connected to an input terminal of an inverted scan control signal SCB (a logical inverted signal of a scan control signal SCB). A control terminal of the inverter INV8' is connected to an input terminal of a scan control signal SC. Accordingly, the inverter INV8 and the inverter INV8' have their output terminals set to high impedance in an exclusive (complementary) manner.

A control terminal of the path switch SW1 and a control terminal of the path switch SW5 are both connected to an input terminal of an internal clock signal CPL. A control terminal of the path switch SW2 and a control terminal of the path switch SW6 are both connected to an input terminal of an inverted internal clock signal CPLB (a logical inverted signal of the internal clock signal CPL). Accordingly, the path switches SW1 and SW5 and the path switches SW2 and SW6 are turned on/off in an exclusive (complementary) manner. In more detail, when the path switches SW1 and SW5 are turned on, the path switches SW2 and SW6 are turned off. Conversely, when the path switches SW1 and SW5 are turned off, the path switches SW2 and SW6 are turned on.

In this way, the nonvolatile storage gate 45 of the configuration example shown in FIG. 2D has basically the same configuration of the loop structure part LOOP (the volatile storage part 42) holding the input data signal D by using the logic gates (the NAND gates NAND1 and NAND2 at a master side and the NAND gates NAND3 and NAND4 at a slave side) connected in the loop shape, as that of the configuration example shown in FIG. 2B. However, the loop structure part LOOP forming the nonvolatile storage gate 45 of the configuration example shown in FIG. 2D eliminates a need of the multiplexers 54 and 56 and is characterized in that it does not require clock stop processing at the time of data saving/recovery and has a serial data input/output function using a scan path.

The nonvolatile storage part NVM includes ferroelectric elements CL1a, CL1b, CL2a and CL2b and N-channel MOS field effect transistors Q1a, Q1b, Q2a and Q2b.

A positive electrode terminal of the ferroelectric element CL1a is connected to a first plate line PL1D of a D system. A negative electrode terminal of the ferroelectric element CL1a is connected to the first input terminal of the NAND gate NAND4 forming the loop structure part LOOP via the circuit separating part SEP (an inverter INV9). The transistor Q1a is connected between both ends of the ferroelectric element CL1a. A gate of the transistor Q1a is connected to an application terminal of a F reset signal FRSTD of the D system.

A positive electrode terminal of the ferroelectric element CL1b is connected to the first input terminal of the NAND gate NAND4 forming the loop structure part LOOP via the circuit separating part SEP (the inverter INV9). A negative electrode terminal of the ferroelectric element CL1b is connected to a second plate line PL2D of the D system. The transistor Q1b is connected between both ends of the ferroelectric element CL1b. A gate of the transistor Q1b is connected to the application terminal of the F reset signal FRSTD of the D system.

A positive electrode terminal of the ferroelectric element CL2a is connected to a first plate line PL1U of a U system. A negative electrode terminal of the ferroelectric element CL2a is connected to the first input terminal of the NAND gate NAND3 forming the loop structure part LOOP via the circuit separating part SEP (an inverter INV10). The transistor Q2a is connected between both ends of the ferroelectric element CL2a. A gate of the transistor Q2a is connected to an application terminal of an F reset signal FRSTU of the U system.

A positive electrode terminal of the ferroelectric element CL2b is connected to the first input terminal of the NAND gate NAND3 forming the loop structure part LOOP via the circuit separating part SEP (the inverter INV10). A negative electrode terminal of the ferroelectric element CL2b is connected to a second plate line PL2U of the U system. The transistor Q2b is connected between both ends of the ferroelectric element CL2b. A gate of the transistor Q2b is connected to the application terminal of the F reset signal FRSTU of the U system.

In this way, the nonvolatile storage gate 45 of the configuration example shown in FIG. 2D has basically the same configuration of the nonvolatile storage part NVM storing the data D held in the loop structure part LOOP in a nonvolatile manner by using the hysteresis characteristics of the ferroelectric elements CL1a, CL1b, CL2a and CL2b, as that of the configuration example shown in FIG. 2B. However, the nonvolatile storage unit NVM forming the nonvolatile storage gate 45 of the configuration example shown in FIG. 2D is characterized in that each of the first plate line, the second plate line and the F reset signal line has two systems (U system/D system) in order to perform a characteristics evaluation of the ferroelectric elements CL1a, CL1b, CL2a and CL2b using the test circuit part TEST.

The circuit separating part SEP includes tri-state inverters INV9 and INV10 for electrically separating the loop structure part LOOP and the nonvolatile storage part NVM from each other. The inverters INV9 and INV10 have their output terminals set to high impedance in response to the control signal E1.

The set/reset control part SRC includes a sense amplifier (differential amplifier) SA and AND gates AND1 and AND2. A first input terminal of the sense amplifier SA is connected to a D system output terminal (a connection node between the negative electrode terminal of the ferroelectric element CL1a and the positive electrode terminal of the ferroelectric element CL1b) of the nonvolatile storage part NVM. A second input terminal of the sense amplifier SA is connected to a U system output terminal (a connection node between the negative electrode terminal of the ferroelectric element CL2a and the positive electrode terminal of the ferroelectric element CL2b) of the nonvolatile storage part NVM. A first output terminal (in an inverted form) of the sense amplifier SA is connected to a first input terminal of the AND gate AND1. A second input terminal of the AND gate AND1 is connected to an input terminal of an external set signal SN. An output terminal of the AND gate AND1 acts as an output terminal of an internal set signal SNL. A second output terminal of the sense amplifier SA is connected to a first input terminal of the AND gate AND2. A second input terminal of the AND gate AND2 is connected to an input terminal of an external reset signal RN. An output terminal of the AND gate AND2 acts as an output terminal of an internal reset signal RNL. A control terminal of the sense amplifier SA is connected to an input terminal of a sense amplifier enable signal SAE.

The clock pulse control part CPC includes a NAND gate NAND5. A first input terminal of the NAND gate NAND5 is connected to an input terminal of an external clock signal CP. A second input terminal (in an inverted form) of the NAND gate NAND5 is connected to an input terminal of a data holding control signal HS. An output terminal of the NAND gate NAND5 acts as an output terminal of the internal clock signal CPL. Accordingly, the internal clock signal CPL is always a high level signal without depending on the external clock signal CP when the data holding control signal HS has a high level (a clock disable state), or is a logical inverted signal of the external clock signal CP when the data holding control signal HS has a low level (a clock enable state).

The test circuit part TEST includes tri-state inverters INV11 to INV14 and path switches SW7 to SW10.

Input terminals of the inverters INV11 and INV12 are both connected to a first digital plate line PL1_D. An output terminal of the inverter INV11 is connected to the first plate line PL1U of the U system. An output terminal of the inverter INV12 is connected to the first plate line PL1D of the D system. A control terminal of the inverter INV11 is connected to an input terminal of an inverted analog enable signal TESTUB (a logical inverted signal of an analog enable signal TESTU) of the U system. A control terminal of the inverter INV12 is connected to an input terminal of an inverted analog enable signal TESTDB (a logical inverted signal of an analog enable signal TESTD) of the D system.

An input terminal of the path switch SW7 is connected to a first analog plate line PL1U_A of the U system. An output terminal of the path switch SW7 is connected to the first plate line PL1U of the U system. A control terminal of the path switch SW7 is connected to an input terminal of the analog enable signal TESTU of the U system. An input terminal of the path switch SW8 is connected to a first analog plate line PL1D_A of the D system. An output terminal of the path switch SW8 is connected to the first plate line PL1D of the D system. A control terminal of the path switch SW8 is connected to an input terminal of the analog enable signal TESTD of the D system.

Input terminals of the inverters INV13 and INV14 are both connected to a second digital plate line PL2_D. An output terminal of the inverter INV13 is connected to the second plate line PL2U of the U system. An output terminal of the inverter INV14 is connected to the second plate line PL2D of the D system. A control terminal of the inverter INV13 is connected to the input terminal of the inverted analog enable signal TESTUB (the logical inverted signal of the analog enable signal TESTU) of the U system. A control terminal of the inverter INV14 is connected to the input terminal of the inverted analog enable signal TESTDB (the logical inverted signal of the analog enable signal TESTD) of the D system.

An input terminal of the path switch SW9 is connected to a second analog plate line PL2U_A of the U system. An output terminal of the path switch SW9 is connected to the second plate line PL2U of the U system. A control terminal of the path switch SW9 is connected to the input terminal of the analog enable signal TESTU of the U system. An input terminal of the path switch SW10 is connected to a second analog plate line PL2D_A of the D system. An output terminal of the path switch SW10 is connected to the second plate line PL2D of the D system. A control terminal of the path switch SW10 is connected to the input terminal of the analog enable signal TESTD of the D system.

In the test circuit part TEST configured as above, the analog enable signal TESTU of the U system and the analog enable signal TESTD of the D system are contradictory to each other. In more detail, when the analog enable signal TESTU of the U system has a high level (enable logic), the analog enable signal TESTD of the D system has a low level (disable logic). Conversely, when the analog enable signal TESTU of the U system has a low level (disable logic), the analog enable signal TESTD of the D system has a high level (enable logic).

Next, an example of an operation of the data processing apparatus 100 configured as above will be described with reference to FIG. 3. FIG. 3 is a time chart showing an operation of the data processing apparatus 100 when only the power generating element 1A generates power.

Since a voltage supplied to the power terminal of the nonvolatile logic 4 is not large enough to drive the nonvolatile logic 4 during a period from a state where the power generating elements 1A to 1C are all inactivated to a state where only the power generating element 1A starts to generate electricity and the output voltage V2 of the low-saturated regulator 3 reaches the stabilized DC voltage, the nonvolatile logic 4 remains turned-off without being driven.

When the output voltage V2 of the low-saturated regulator 3 reaches the stabilized DC voltage (at time t1) after only the power generating element 1A starts to generate electricity, the nonvolatile logic 4 is driven to be turned on.

Thereafter, until time t2 is reached, the input voltage V1 of the low saturated regulator 3 and the output voltage V3 of the power generating element 1A are varied depending on power generation conditions of the power generating element 1A within a range where the low-saturated regulator 3 can perform regulating by a voltage drop. Therefore, during a period from time t1 to time t2, the nonvolatile logic 4 is driven such that the output voltage V4 of the level shifter 6A has a high level and an output voltage V6 of the level shifter 6B and an output voltage V8 of the level shifter 6C have a low level.

When the nonvolatile logic 4 is changed from a turned-off state to a turned-on state, data recovery is performed in the nonvolatile logic 4, and data read from the nonvolatile storage part 43 is written in the volatile storage part 42.

After the data recovery is performed, data processing based on the output voltages V4, V6 and V8 (in this example, data processing based on V4=High, V6=Low and V8=Low) of the level shifters 6A to 6C is performed by the logical operation part 41, and the data written in the volatile storage part 42 is updated according to a result of the logical operation (data processing result) of the logical operation part 41.

After the update of the data written in the volatile storage part 42 is completed, data saving is performed and data read from the volatile storage part 42 is written in the nonvolatile storage part 43.

After the data saving is completed, the nonvolatile logic 4 is in a standby state until it is switched from a turned-on state to a turned-off state (until time t2 is reached). When time t2 is reached, since a voltage supplied to the power terminal of the nonvolatile logic 4 is not large sufficient to drive the nonvolatile logic 4, the nonvolatile logic 4 is not driven and is therefore in a turned off state.

Since the above-described operation can reflect a change in difference in output state among the plurality of power generating elements 1A to 1C in the data generated by the data processing, it is possible to generate data of vector quantity related to the power generating elements 1A to 1C.

For example, if only the power generating element 1A generates electricity at the time of first driving of the nonvolatile logic 4, only the power generating element 1B generates electricity at the time of second driving of the nonvolatile logic 4, and only the power generating element 1C generates electricity at the time of third driving of the nonvolatile logic 4, data is stored in the nonvolatile logic 4 according to transition of 1A→1B→1C when the third driving of the nonvolatile logic 4 is completed.

As another example, if only the power generating element 1C generates electricity at the time of first driving of the nonvolatile logic 4, only the power generating element 1B generates electricity at the time of second driving of the nonvolatile logic 4, and only the power generating element 1A generates electricity at the time of third driving of the nonvolatile logic 4, data is stored in the nonvolatile logic 4 according to transition of 1C→1B→1A when the third driving of the nonvolatile logic 4 is completed.

As another example, if only the power generating element 1A generates electricity at the time of first driving of the nonvolatile logic 4, only the power generating elements 1A and 1B generate electricity at the time of second driving of the nonvolatile logic 4, only the power generating element 1B generates electricity at the time of third driving of the nonvolatile logic 4, only the power generating elements 1B and 1C generate electricity at the time of fourth driving of the nonvolatile logic 4, and only the power generating element 1C generates electricity at the time of fifth driving of the nonvolatile logic 4, data is stored in the nonvolatile logic 4 according to transition of 1A→1A&1B→1B→1B&1C→1C when the fifth driving of the nonvolatile logic 4 is completed.

Further, in this embodiment, the low-saturated regulator 3 is provided to prevent unstable driving of the nonvolatile logic 4 due to an effect of a variation of the voltage V1 with a change in output state of the power generating elements 1A to 1C on a power supply voltage of the nonvolatile logic 4. However, if the change in output state of the power generating elements 1A to 1C is small or the nonvolatile logic 4 is highly resistant against a variation of the power supply voltage, the low-saturated regulator 3 may not be provided or may be replaced with a simple voltage stabilizing means such as a smoothing capacitor.

Although it has been illustrated in this embodiment that the data recovery is performed by the nonvolatile logic 4, the data recovery may not be performed as long as data generated every time the nonvolatile logic 4 is driven are individually stored without being integrated.

<Second Embodiment>

Figure 4:
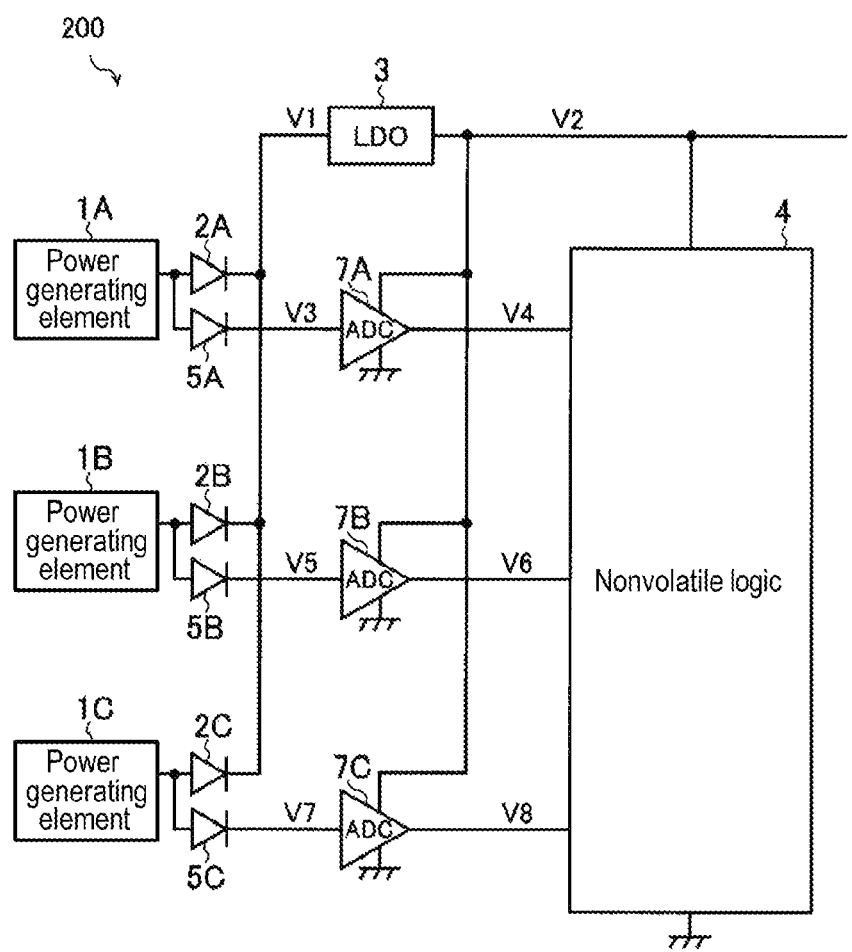
FIG. 4 is a view showing a data processing apparatus according to a second embodiment of the present disclosure.

FIG. 4 is a view showing a data processing apparatus according to a second embodiment. In FIG. 4, the same elements and portions as FIG. 1 are denoted by the same reference numerals and explanation of which is not repeated.

As shown in FIG. 4, a data processing apparatus 200 is configured to replace the level shifters 6A to 8C in the data processing apparatus 100 shown in FIG. 1 with analog-digital converters (ADCs) 7A to 7C.

In the data processing apparatus 100 shown in FIG. 1, the nonvolatile logic 4 performs the data processing based on a result of the detection on whether or not each of the output voltages of the power generating elements 1A to 1C is equal to a threshold. In contrast, in the data processing apparatus 200 shown in FIG. 4, the nonvolatile logic 4 can perform the data processing based on a value of each of the output voltages of the power generating elements 1A to 1C. Therefore, in the second embodiment, the nonvolatile logic 4 can produce data of more detailed vector quantity related to the power generating elements 1A to 1C.

<Example of Arrangement of Power Generating Element>

Figure 5:
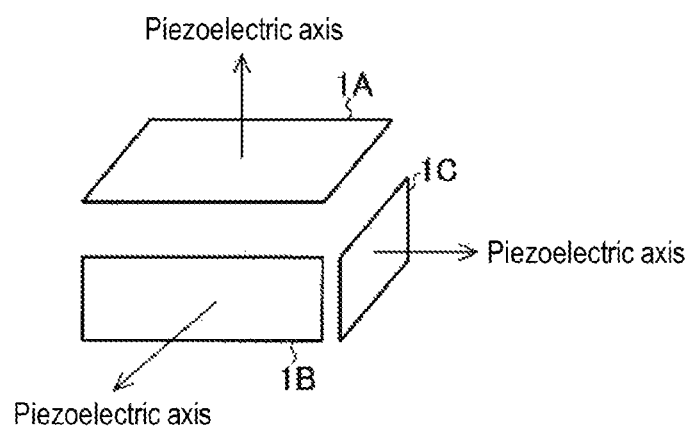
FIG. 5 is a view showing an arrangement example of power generating elements.
Figure 6:
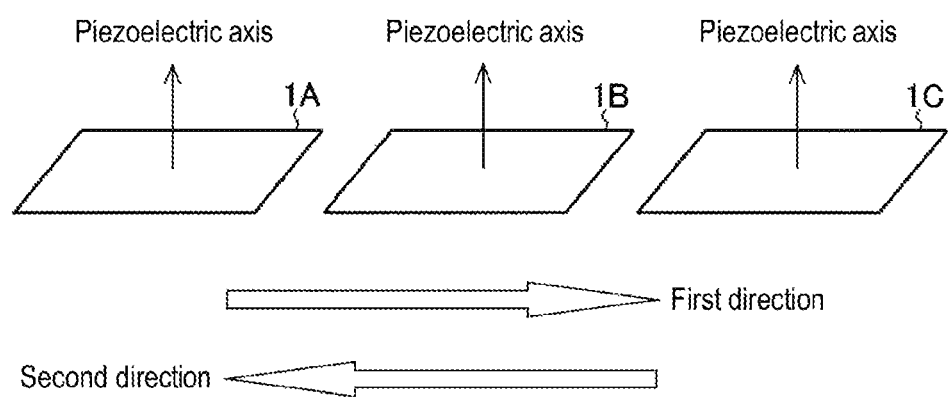
FIG. 6 is a view showing another arrangement example of power generating elements.

FIGS. 5 and 6 show examples of an arrangement of the power generating elements 1A to 1C in the above-described first and second embodiments. It is here assumed that the power generating elements 1A to 1C are bimorphs.

In the arrangement example shown in FIG. 5, the power generating elements 1A to 1C are arranged such that a piezoelectric axis of each power generating element is perpendicular to each of piezoelectric axes of the other two power generating elements. Thus, it is possible to implement a battery-less 3-axis motion logger. When the arrangement example shown in FIG. 5 is applied to the first embodiment, the presence or absence of motion (acceleration) of each axis is logged. When the arrangement example shown in FIG. 5 is applied to the second embodiment, the magnitude of motion (acceleration) of each axis is logged.

In the arrangement example shown in FIG. 6, the power generating elements 1A to 1C are arranged side by side in a direction perpendicular to piezoelectric axes of the power generating elements 1A to 1C aligned in the same direction. Thus, it is possible to distinguish between a power generation in a first direction order (i.e., an order of power generating element 1A→power generating element 1B→power generating element 1C) and a power generation in a second direction order (i.e., an order of power generating element 1C→power generating element 1B→power generating element 1A) and store these direction orders.

Therefore, for example by referring to data stored in the nonvolatile logic 4, it is possible to detect whether a moving body applying a force to the power generating elements 1A to 1C is moved in the first direction or the second direction.

<Transmission System>

Figure 7:
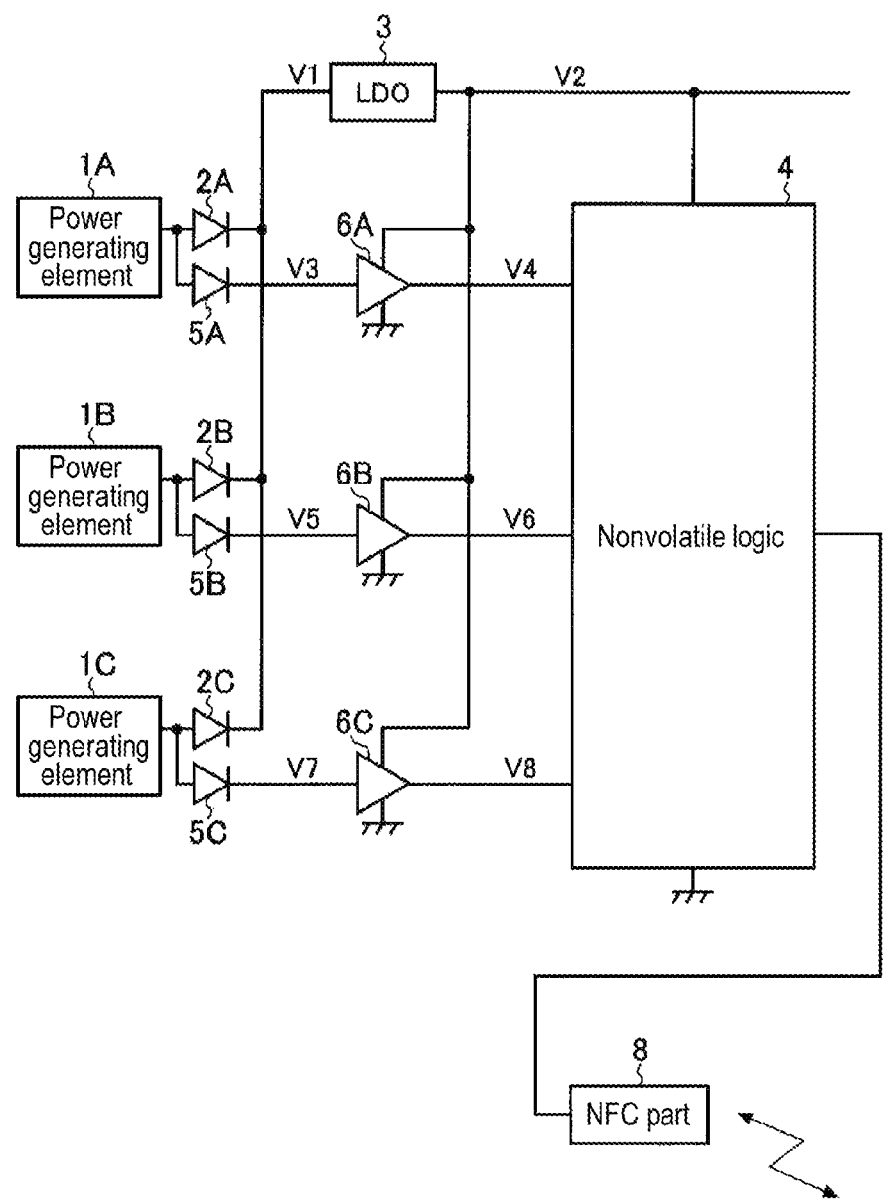
FIG. 7 is a view showing one configuration example of a transmission system.

FIG. 7 is a view showing one configuration example of a transmission system including the data processing apparatus according to the first embodiment. In FIG. 7, the same elements and portions as FIG. 1 are denoted by the same reference numerals and explanation of which is not repeated.

The transmission system shown in FIG. 7 includes the above-described data processing apparatus according to the first embodiment, and an NFC (Near Field Communication) part 8 which conducts near field communication with external equipment (not shown).

The NFC part 8 is driven with power received by near field communication from the external equipment which is located in a region within a predetermined range from the NFC part 8. In addition, the NFC part 8 sends a command to request data output to the data control part 44 of the nonvolatile logic 4. At this time, if the nonvolatile logic 4 is being driven, the NFC part 8 receives data written in the volatile storage part 42 of the nonvolatile logic 4 from the nonvolatile logic 4 and transmits the received data to the external equipment by near field communication.

Thus, the external equipment can acquire a result of the data processing of the nonvolatile logic 4 without requiring a wired connection with the transmission system shown in FIG. 7. In addition, since the NFC part 8 is driven with the power received from the external equipment, the transmission system shown in FIG. 7 may be a battery-less transmission system.

Figure 8:
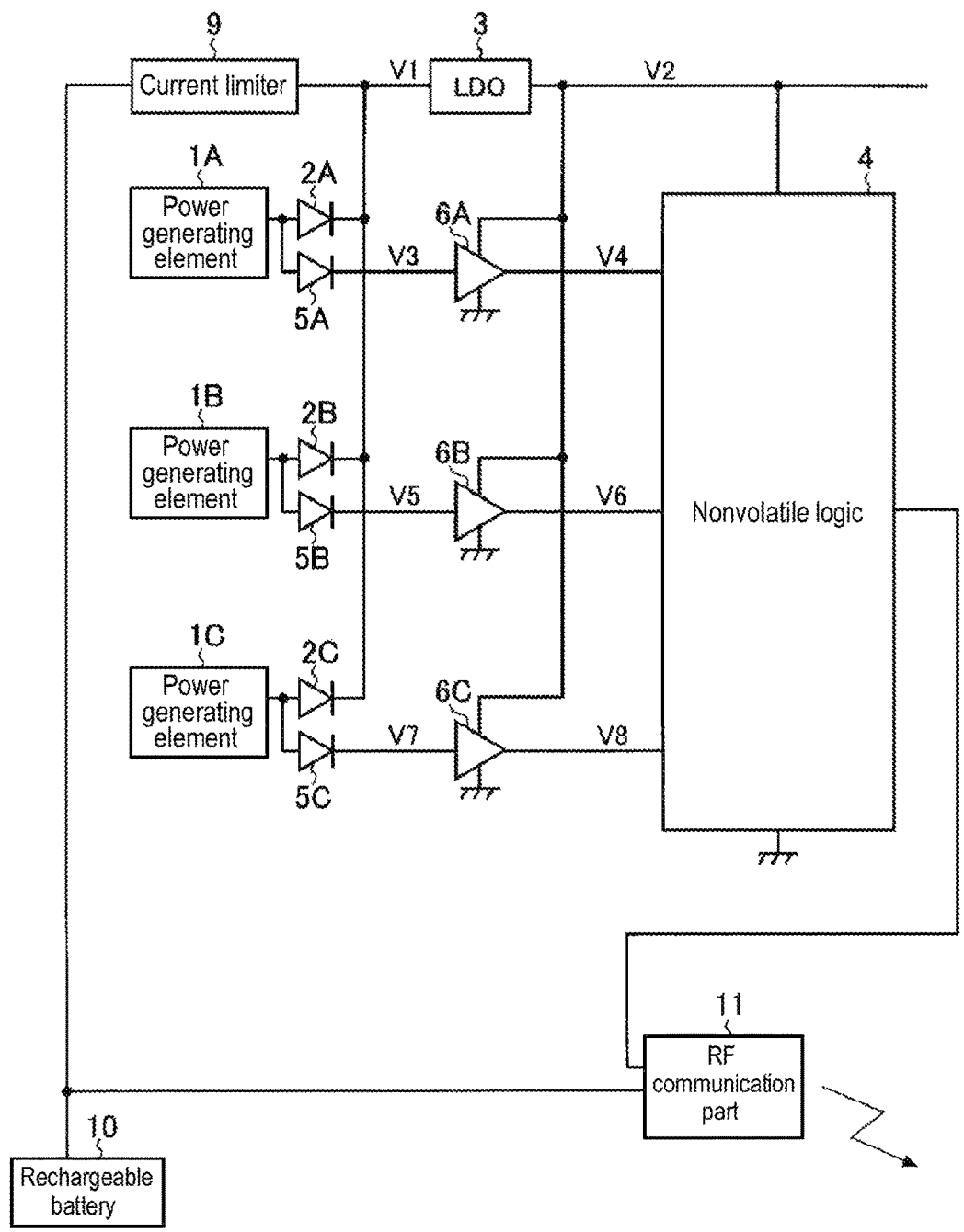
FIG. 8 is a view showing another configuration example of the transmission system.

FIG. 8 is a view showing another configuration example of the transmission system including the data processing apparatus according to the first embodiment. In FIG. 8, the same elements and portions as FIG. 1 are denoted by the same reference numerals and explanation of which is not repeated.

The transmission system shown in FIG. 8 includes the above-described data processing apparatus according to the first embodiment, a current limiter 9, a rechargeable battery 10, and an RF communication part 11 which conducts RF communication with external equipment (not shown).

The input terminal of the low-saturated regulator 3 is connected to the rechargeable battery 10 via the current limiter 9. When a limited current of the current limiter 9 flows into the rechargeable battery 10, some of power output from the power generating elements 1A to 1C is supplied into the rechargeable battery 10, thereby charging the rechargeable battery 10.

In addition, the rechargeable battery 10 is connected to the RF communication part 11 and the RF communication part 11 is driven with power discharged from the rechargeable battery 10. This makes it possible to drive the RF communication part 11 even when a transmittable distance of the RF communication part 11 is long and power consumption of the RF communication part 11 is large.

For example, immediately after RF communication between the RF communication part 11 and the external equipment is established, the RF communication part 11 sends a command to request data output to the data control part 44 of the nonvolatile logic 4. At this time, if the nonvolatile logic 4 is being driven, the RF communication part 11 receives data written in the volatile storage part 42 of the nonvolatile logic 4 from the nonvolatile logic 4 and transmits the received data to the external equipment.

Thus, the external equipment can acquire a result of the data processing of the nonvolatile logic 4 without requiring a wired connection with the transmission system shown in FIG. 8. In addition, even when a distance between the external equipment and the transmission system shown in FIG. 8 is long, the external equipment can acquire a result of the data processing of the nonvolatile logic 4.

In addition, in some embodiments, if the data processing result is a predetermined result (for example, a sign of collapse of a structure in which the transmission system is installed), the nonvolatile logic 4 may generate data indicating a warning and output it to the RF communication part 11 and, upon receiving the data indicating the warning from the nonvolatile logic 4, the RF communication part 11 may transmit a warning signal to the external equipment. In addition, as described above, since the RF communication part 11 is driven with the power discharged from the rechargeable battery 10, even when the output power V1 and the output power V2 are decreased immediately after the nonvolatile logic 4 outputs the data indicating the warning to the RF communication part 11, the RF communication part 11 can cope with a sudden warning.

Thus, the external equipment can receive the warning signal with no delay. Therefore, an owner of the external equipment can cope with a warning.

<Structure>

Figure 9:
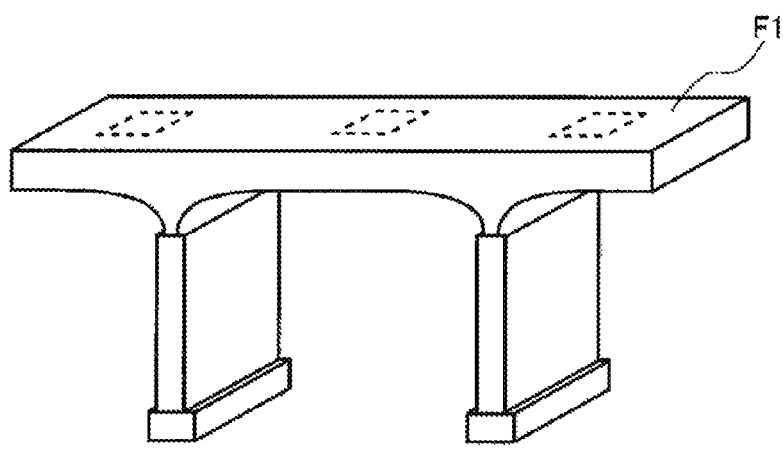
FIG. 9 is an external view of a bridge.

FIG. 9 is an external view of a bridge which is a kind of structure. For example, when the transmission system shown in FIG. 7 is installed inside the bridge shown in FIG. 9 and the power generating elements 1A to 1C are installed at positions of dotted frames in FIG. 9 on the upper surface of the bridge, the battery-less nonvolatile logic 4 can store information on the number and moving directions of moving bodies (persons and vehicles) coming and going through the bridge. In this case, when the NFC part 8 is installed at a place accessible by hands of persons on the surface of the bridge, it is possible to easily transfer data to the NFC-enabled external equipment. The transmission system shown in FIG. 7 is battery-less and accordingly maintenance-free and therefore can be suitably embedded inside the structure.

Taking advantage of being maintenance-free, the transmission system shown in FIG. 7 may be installed in civil engineering structures (for example, tunnels), architectural structures (for example, buildings) or members (for example, doors) constituting the architectural structures, in addition to the bridge.

In addition, since the transmission system shown in FIG. 8 uses the rechargeable battery 10 with a long lifetime, it is substantially maintenance-free or is easily maintained with a structure to facilitate a replacement of the rechargeable battery 10. Therefore, the transmission system shown in FIG. 8 is suitably embedded inside civil engineering structures, architectural structures or members constituting the architectural structures.

<Solar Power Generation Apparatus>

Figure 10:
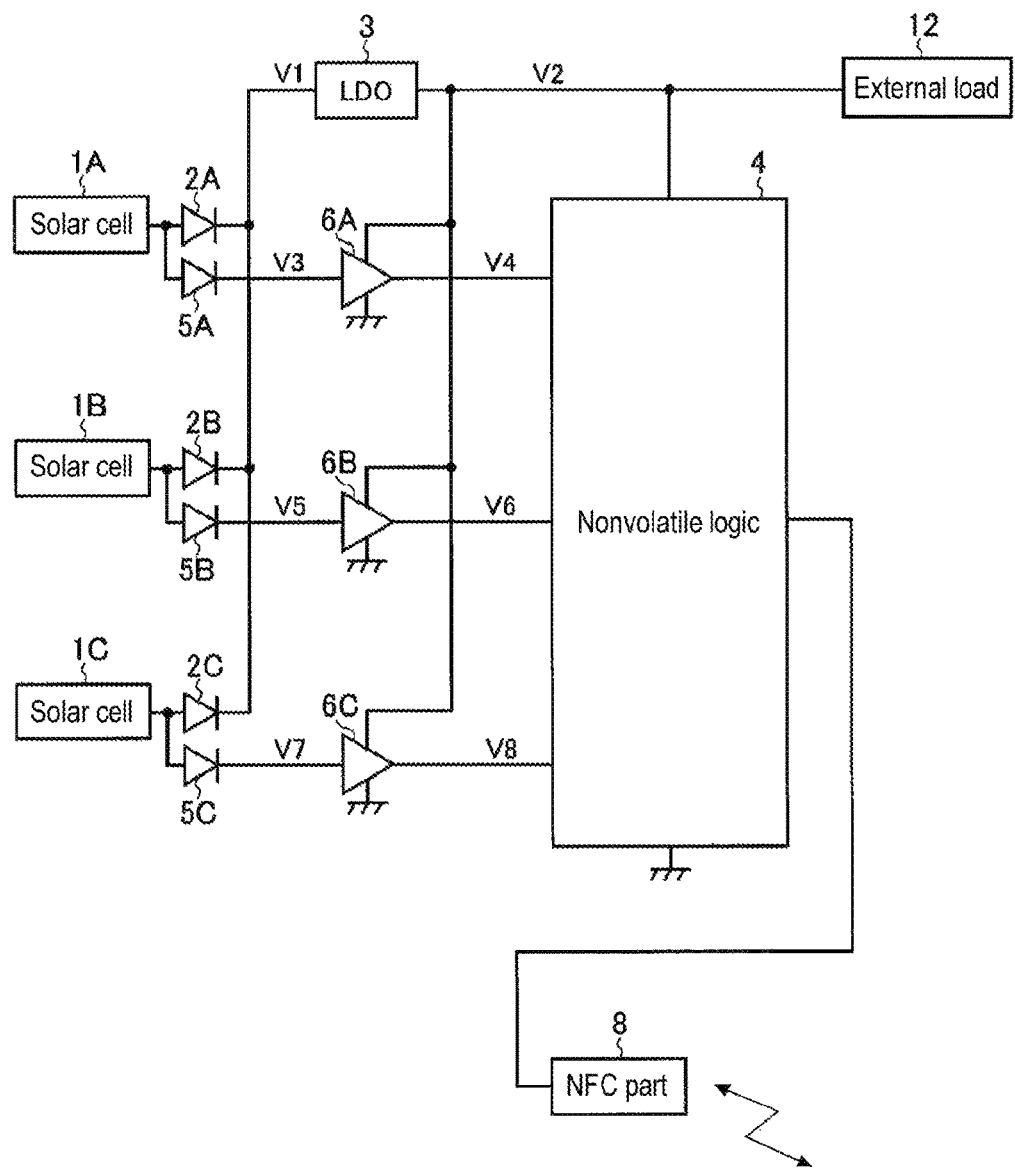
FIG. 10 is a view showing a solar power generation apparatus.

FIG. 10 is a view showing one example of a solar power generation apparatus. The solar power generation apparatus shown in FIG. 10 is configured to include solar cells as the power generating elements 1A to 1C in the transmission system shown in FIG. 7 and supply the output voltage V2 of the low-saturated regulator 3 to an external load 12 as well as the nonvolatile logic 4.

When the power generating elements 1A to 1C are arranged to be apart from each other, the nonvolatile logic 4 can memorize how the direction of incidence of sunlight is changed. This may eliminate a need to install a pyranometer.

<Other Modifications>

Although it has been illustrated in the above embodiments that the number of power generating elements is 3, the present disclosure is not limited thereto but may be configured to include a plurality of power supplies incorporating power generating elements.

For example, instead of the three power generating elements, the present disclosure may employ a combination of power generating elements and primary batteries such as button batteries. In this case, since the primary batteries can reliably drive a nonvolatile logic and power generated by the power generating elements can also drive the nonvolatile logic, it is possible to extend the lifetime of the primary batteries and further continue data processing by the nonvolatile logic even after the primary batteries come to an end.

For example, a combination of a plurality of batteries may be replaced for the three power generating elements. In this case, the nonvolatile logic can memorize an order of damages of the plurality of batteries. This makes it possible to analyze the cause of the damages. In addition, the nonvolatile logic can memorize how a difference in performance among the plurality of batteries is changed.

It has been illustrated in the above embodiments that the power generating elements, which may output a positive voltage as well as a negative voltage, do not effectively use the negative voltage. However, for example if full-wave rectifying circuits are replaced for the backflow preventing diodes 2A to 2C, the backflow preventing diodes 5A to 5C are excluded, and the level shifter 6A to 6C and the analog-digital converters 7A to 7C are set to cope with an input of the negative voltage, the negative voltage can be effectively used.

According to the present disclosure in some embodiments, it is possible to provide a data processing apparatus which is capable of reflecting a change in difference in output state among a plurality of power supplies in data generated by data processing and accordingly generating data of vector quantity related to the power supplies, a structure and a power generation apparatus including the same.

While certain embodiments have been described, these embodiments have been presented by way of example only, and are not intended to limit the scope of the disclosures. Indeed, the embodiments described herein may be embodied in a variety of other forms; for example, a logic level may be inverted by adding an inverter function to the level shifter used in the first embodiment. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A data processing apparatus comprising:
a plurality of power supplies, at least one of the plurality of power supplies being a power generating element that converts external non-electric energy into electric energy, the plurality of power supplies being arranged side by side, and the non-electric energy being caused by one or more external moving objects;
a nonvolatile logic configured to be driven with power output from the plurality of power supplies;
a plurality of detection parts configured to detect output states of the plurality of power supplies;
a power converting part provided between the plurality of power supplies and the plurality of detection parts, and configured to convert the power output from the plurality of power supplies into stabilized DC power and supply the stabilized DC power to the plurality of detection parts and the nonvolatile logic; and
a plurality of backflow-preventing diodes provided between the plurality of power supplies and the plurality of detection parts, respectively,
wherein the nonvolatile logic performs a data processing based on a result of the detection of the plurality of detection parts to obtain moving directions of the one or more external moving objects, and stores the moving directions of the one or more external moving objects, and
wherein the plurality of detection parts are configured to be driven by using the stabilized DC power supplied from the power converting part.

2. The data processing apparatus of claim 1, wherein the nonvolatile logic includes:
a logical operation part;
a volatile storage part;
a nonvolatile storage part; and
a data control part,
wherein, after the nonvolatile logic is switched from a state where the nonvolatile logic is not driven to a state where the nonvolatile logic is driven with power supplied to the nonvolatile logic, the data control part writes data read from the nonvolatile storage part in the volatile storage part,
wherein the logical operation part performs the data processing and updates the data written in the volatile storage part, and
wherein the data control part reads the updated data written in the volatile storage part from the volatile storage part and writes the read data in the nonvolatile storage part.

3. The data processing apparatus of claim 1, wherein at least two of the plurality of power supplies are piezoelectric elements which are arranged such that piezoelectric axes of the piezoelectric elements lie in different directions.

4. A structure comprising:
the data processing apparatus of claim 1, wherein all of the plurality of power supplies are power generating elements; and
a transmission part configured to be operated with power supplied from external equipment and transmit a result of the data processing of the nonvolatile logic to the external equipment.

5. The structure of claim 4, wherein the transmission part is an RF communication part conducting near field communication with the external equipment and is operated with the power supplied from the external equipment by the near field communication.

6. The structure of claim 4, further comprising: a rechargeable battery configured to supply power to the transmission part,
wherein the rechargeable battery is charged with a portion of the power output from the plurality of power supplies.

7. The structure of claim 6, wherein, if the result of the data processing of the nonvolatile logic is a predetermined result, the nonvolatile logic generates data indicating a warning and outputs the data to the transmission part, and wherein, in response to receiving the data indicating the warning from the nonvolatile logic, the transmission part transmits a warning signal to the external equipment.

8. A power generation apparatus comprising:

the data processing apparatus of claim 1; and a transmission part configured to be operated with power supplied from external equipment and transmit a result of the data processing of the nonvolatile logic to the external equipment, wherein each of the plurality of power supplies is a solar cell.

9. The data processing apparatus of claim 1, wherein the nonvolatile logic performs the data processing based on the result of the detection of the plurality of detection parts to further obtain the number of the one or more external moving objects, and stores the number of the one or more external moving objects.

10. The data processing apparatus of claim 1, wherein the plurality of power supplies include a first power supply and a second power supply that are different from each other, wherein the plurality of backflow-preventing diodes include a first backflow-preventing diode and a second backflow-preventing diode that are different from each other, wherein the plurality of detection parts include a first detection part and a second detection part that are different from each other, wherein the first backflow-preventing diode is provided between the first power supply and the first detection part, and wherein the second backflow-preventing diode is provided between the second power supply and the second detection part.

* * * * *